(12) United States Patent
Saunders et al.

(10) Patent No.: US 9,387,821 B1
(45) Date of Patent: Jul. 12, 2016

(54) VEHICLE RESTRAINT SYSTEMS AND METHODS OF USE AND MANUFACTURE THEREOF

(71) Applicant: Honda Motor Co., Ltd., Tokyo (JP)

(72) Inventors: Nathaniel Robert Saunders, Westerville, OH (US); Donald W. Jackson, Zanesfield, OH (US); Murthy Ayyagari, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/740,900

(22) Filed: Jun. 16, 2015

(51) Int. Cl.
*B60R 21/213* (2011.01)
*B60R 21/215* (2011.01)
*B60R 21/2165* (2011.01)
*B60R 21/232* (2011.01)
*B60R 21/231* (2011.01)

(52) U.S. Cl.
CPC ............. *B60R 21/215* (2013.01); *B60R 21/213* (2013.01); *B60R 21/2165* (2013.01); *B60R 21/232* (2013.01); *B60R 21/23138* (2013.01); *B60R 2021/21512* (2013.01); *B60R 2021/21537* (2013.01)

(58) Field of Classification Search
CPC B60R 21/213; B60R 21/215; B60R 21/2165; B60R 21/23138; B60R 21/232; B60R 2021/21512; B60R 2021/21537
See application file for complete search history.

(56) References Cited

U.S. PATENT DOCUMENTS

| | | |
|---|---|---|
| 5,110,647 A | 5/1992 | Sawada et al. |
| 5,219,179 A | 6/1993 | Eyrainer et al. |
| 5,791,683 A | 8/1998 | Shibata et al. |
| 5,979,931 A | 11/1999 | Totani et al. |
| 6,364,346 B1 | 4/2002 | Preisler et al. |
| 6,502,855 B1 | 1/2003 | Greiner et al. |
| 6,764,633 B2 | 7/2004 | Takahashi et al. |
| 6,835,439 B1 | 12/2004 | Kondo et al. |
| 7,100,941 B2 | 9/2006 | Riha et al. |
| 7,140,636 B2 | 11/2006 | DePue et al. |
| 7,445,233 B2 | 11/2008 | McKimson |
| 7,458,604 B2 | 12/2008 | Hier et al. |
| 7,677,593 B2 | 3/2010 | Downey |

(Continued)

*Primary Examiner* — Laura Freedman
(74) *Attorney, Agent, or Firm* — Kenealy Vaidya LLP (57) ABSTRACT

Some embodiments are directed to an airbag lid defining a surface configured to cover a portion of an airbag prior to deployment. The airbag lid can be separated from a hinge side portion and a pillar side portion of an outer fringe by a seam that can tear and thereby separate the airbag lid from the hinge side portion and the pillar side portion of the outer fringe upon airbag deployment. The airbag lid includes a hinge portion disposed adjacent a hinge side edge of the airbag lid assembly, the hinge portion remaining attached to a window frame of a vehicle subsequent to airbag deployment. The hinge portion can include a hinge that is configured to enable the airbag lid to bend about the hinge, such that a portion of the airbag lid at an interior side of the hinge is maneuvered away from the structural pillar upon airbag deployment.

20 Claims, 5 Drawing Sheets

(56) References Cited

U.S. PATENT DOCUMENTS

| | | |
|---|---|---|
| 7,780,186 B2 | 8/2010 | Maertens |
| 7,793,972 B2 | 9/2010 | Downey |
| 7,931,295 B2 * | 4/2011 | Inui ................. B60R 13/025 |
| | | 280/728.2 |
| 8,091,939 B2 * | 1/2012 | Forsyth ................ B60R 21/12 |
| | | 280/749 |
| 8,109,532 B2 * | 2/2012 | Schirm ............... B60R 21/213 |
| | | 280/730.2 |
| 8,801,033 B2 | 8/2014 | Breed |
| 8,807,592 B2 | 8/2014 | Bieck et al. |
| 8,936,270 B2 | 1/2015 | Kurahashi |
| 8,973,941 B2 * | 3/2015 | Verner ................ B60R 13/025 |
| | | 280/728.3 |
| 2003/0124295 A1 | 7/2003 | Gundlach et al. |
| 2005/0116447 A1 * | 6/2005 | Ryu ................... B60R 21/215 |
| | | 280/728.2 |
| 2005/0269804 A1 | 12/2005 | Yamada et al. |
| 2007/0187930 A1 | 8/2007 | Chitteti et al. |
| 2008/0185822 A1 | 8/2008 | Jonietz et al. |

\* cited by examiner

VEHICLE RESTRAINT SYSTEMS AND METHODS OF USE AND MANUFACTURE THEREOF

BACKGROUND

The disclosed subject matter relates to vehicle restraint systems, and methods of use and manufacture thereof. More particularly, the disclosed subject matter relates to vehicle airbag systems, methods and apparatus for enclosing, storing and/or deploying vehicle airbags, and methods of manufacturing vehicular airbag systems including components that facilitate airbag enclosure, storage, and/or deployment.

Vehicles can be provided with various systems and apparatus for restraining vehicular passengers, such as in the event of a collision. For example, some related art vehicles are provided with airbags that inflate if forces are sensed or otherwise detected that indicate a collision or other event that may transmit potentially harmful forces to a vehicle occupant. Under these conditions, the airbag is rapidly inflated for the purpose of restraining the vehicle occupant to prevent or reduce injuries, such as by providing a buffer between the occupant and other objects, e.g., portions of the vehicle's interior.

SUMMARY

As one example, in the event of a vehicular front collision, a front airbag can be configured and oriented to deploy between the occupant and a portion of the vehicular interior immediately in front of the occupant. The forces resulting from a collision between a front portion of the vehicle and another object may cause the occupant to move forward and contact the airbag instead of portions of the vehicular interior that would otherwise be contacted (e.g., portions of the vehicle interior immediately in front of the occupant), thereby reducing, mitigating or preventing occupant injuries.

As another example, a side airbag can be configured and oriented to deploy between the occupant and a portion of the vehicular interior immediately adjacent (to the side of) the occupant. The forces resulting from a collision between a side portion of the vehicle and another object may cause the occupant to move sideways and contact the airbag instead of portions of the vehicular interior that would otherwise be contacted (e.g., portions of the vehicle interior immediately adjacent and to the side of the occupant), thereby reducing, mitigating or preventing occupant injuries.

The configuration, size, shape, installation location, orientation, storage components, etc., of an airbag system may vary depending on the type of vehicle, application, etc., to enhance passenger outcomes. As one example, side airbags, such as airbags that are designed to protect a vehicle occupant from injuries resulting from colliding with a side interior portion of the vehicle, can be configured for installation at or adjacent a vehicle door, such as adjacent a vehicle door window. During installation, the side airbag can be rolled, folded, or both, and retained in a rolled or folded state behind a housing lid assembly adjacent the vehicle window.

During a collision, vehicular sensors trigger activation of an inflator, which can rapidly fill the airbag with an inflation gas. The airbag then rapidly changes from a rolled or folded configuration to a deployed, inflated configuration and thereby restrains the occupant and provides a buffer between the passenger and a portion of the vehicle's interior that the passenger would otherwise impact. In the case of the side airbag, a buffer is provided between the vehicle occupant and a side portion of the vehicle's interior, such as at or adjacent the vehicle door.

As disclosed above, a side airbag can be rolled, folded, or both, and retained in a rolled or folded state behind a housing lid assembly, such as at a location adjacent the vehicle window, and in some cases at interior side of a pillar of the vehicle's frame. The methods and apparatus for storing or retaining the side airbag, including the housing lid assembly, may be subject to various challenges. For example, the housing lid assembly should be configured to avoid impeding, and to move out of the way of, the airbag as it inflates and is deployed. In other words, it may be beneficial for the housing lid assembly to facilitate or at least not impede controlled deployment of the side airbag.

However, it may also be beneficial for at least a portion of the lid assembly to be secured or anchored to a structure of the vehicle, such as a section at the vehicle interior, frame, pillar, etc., so as to avoid the housing lid assembly constituting a projectile as the airbag inflates and is deployed, which may potentially injure a vehicle occupant. Maintaining a connection between a section of the housing lid assembly and the vehicle interior structure to which it is secured may be especially challenging based on the relatively high forces involved in airbag inflation and deployment. It may also be especially challenging to maintain this connection while also facilitating airbag inflation and deployment.

In order for the housing lid assembly to facilitate airbag inflation and deployment, while also remaining attached to a section of the vehicle, it may be beneficial to maneuver the housing lid assembly in a beneficial manner. For example, it may be beneficial to maneuver the housing lid assembly to avoid contact with vehicle occupants, and/or to otherwise shield the lid assembly (especially as it is moving, such as during airbag inflation and deployment) from vehicle occupants to avoid injuries. In addition, it may be beneficial for the lid assembly to terminate at a location (i.e., after airbag deployment) that is isolated from the vehicle occupants to reduce or avoid injuries.

The housing lid assembly may be exposed to the interior of the vehicle compartment, and thus may be exposed for viewing by vehicle occupants. Thus, it may be beneficial for the housing lid assembly to be aesthetically pleasing, and/or communicate with other vehicle interior components, such as adjacent surfaces, so as to not disrupt and/or even enhance the vehicle interior aesthetics.

It may therefore be beneficial to address at least one of the above challenges disclosed above, and/or address other challenges. For example, it may be beneficial to provide a vehicle airbag system, and/or components thereof, such as an airbag housing lid assembly, that: 1) avoids impeding the airbag as it inflates and is deployed, and/or facilitates controlled deployment of the side airbag; 2) remains secured or anchored to the vehicle interior structure so as to avoid constituting a projectile as the airbag inflates and is deployed; 3) is maneuvered to avoid contact with vehicle occupants, and/or to otherwise shield the vehicle lid assembly (especially as it is moving, such as during airbag inflation and deployment) from vehicle occupants, and also terminates after deployment at a location that is isolated from the vehicle occupants; and/or 4) is aesthetically pleasing, and/or communicates with other vehicle interior components to enhance the vehicle interior aesthetics.

Some embodiments are therefore directed to an airbag lid assembly for use with an airbag disposed for deployment within a vehicle interior. At least a portion of the airbag can be disposed prior to deployment at a roof element adjacent a structural pillar that is proximate a window of the vehicle. The window can be defined at least in part by a window frame at the structural pillar of the vehicle.

The airbag lid assembly can include an outer fringe that defines a portion of an outer periphery of the airbag lid assembly. The outer fringe can include a hinge side portion defining a first section of a hinge side edge of the airbag lid assembly adjacent the window, and a pillar side portion defining a pillar side edge of the airbag lid assembly adjacent the structural pillar. The airbag lid assembly can also include an airbag lid defining a surface that is configured to cover at least a portion of the airbag prior to deployment. The airbag lid can be separated from the hinge side portion and the pillar side portion of the outer fringe by a seam that is configured to tear and thereby separate the airbag lid from the hinge side portion and the pillar side portion of the outer fringe upon airbag deployment. The airbag lid can include a hinge portion disposed adjacent a second section of the hinge side edge of the airbag lid assembly. The hinge portion can remain attached to the window frame of the vehicle subsequent to airbag deployment, and can include a hinge that is configured to enable the airbag lid to bend about the hinge, such that a portion of the airbag lid at an interior side of the hinge is maneuvered away from the structural pillar upon airbag deployment.

Some other embodiments are directed to an airbag assembly for use within a vehicle interior. The vehicle can include a roof element adjacent a structural pillar that is proximate a window of the vehicle. The window can be defined at least in part by a window frame at the structural pillar of the vehicle. The airbag assembly can include an airbag disposed for deployment within the vehicle interior. At least a portion of the airbag can be disposed prior to deployment at the roof element of the vehicle.

The airbag assembly can also include an airbag lid assembly that includes an outer fringe that defines a portion of an outer periphery of the airbag lid assembly. The outer fringe can include a hinge side portion defining a first section of a hinge side edge of the airbag lid assembly adjacent the window, and a pillar side portion defining a pillar side edge of the airbag lid assembly adjacent the structural pillar. The airbag lid assembly can also include an airbag lid defining a surface that is configured to cover at least a portion of the airbag prior to deployment. The airbag lid can be separated from the hinge side portion and the pillar side portion of the outer fringe by a seam that is configured to tear and thereby separate the airbag lid from the hinge side portion and the pillar side portion of the outer fringe upon airbag deployment. The airbag lid can include a hinge portion disposed adjacent a second section of the hinge side edge of the airbag lid assembly. The hinge portion can remain attached to the window frame of the vehicle subsequent to airbag deployment, and can include a hinge that is configured to enable the airbag lid to bend about the hinge, such that a portion of the airbag lid at an interior side of the hinge is maneuvered away from the structural pillar upon airbag deployment.

Still other embodiments are directed to a method of manufacturing an airbag lid assembly for use with an airbag disposed for deployment within a vehicle interior. At least a portion of the airbag can be disposed prior to deployment at a roof element adjacent a structural pillar that is proximate a window of the vehicle. The window can be defined at least in part by a window frame at the structural pillar of the vehicle.

The method can include: forming an outer fringe so as to define a portion of an outer periphery of the airbag lid assembly; configuring the outer fringe to define a hinge side portion that forms a first section of a hinge side edge of the airbag lid assembly adjacent the window, and a pillar side portion that forms a pillar side edge of the airbag lid assembly adjacent the structural pillar; forming an airbag lid so as to define a surface that is configured to cover at least a portion of the airbag prior to deployment; separating the airbag lid from the hinge side portion and the pillar side portion of the outer fringe by a seam that is configured to tear and thereby separate the airbag lid from the hinge side portion and the pillar side portion of the outer fringe upon airbag deployment; configuring the airbag lid to include a hinge portion disposed adjacent a second section of the hinge side edge of the airbag lid assembly, the hinge portion being configured to remain attached to the window frame of the vehicle subsequent to airbag deployment; and forming a hinge that is configured to enable the airbag lid to bend about the hinge such that a portion of the airbag lid at an interior side of the hinge is maneuvered away from the structural pillar upon airbag deployment.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of an airbag lid assembly 10 are disclosed below, and FIGS. 1-11 illustrate some of these embodiments. However, embodiments are intended to include or otherwise cover many different embodiments and structures for facilitating airbag deployment.

The embodiments are disclosed below and in the context of an airbag assembly of an automobile. However, the embodiments are intended to be applicable to any automobile airbag assembly, any type of automobile, and any type of vehicle, and to further be applicable to non-vehicular safety systems.

Embodiments are also disclosed below in the context of a side curtain airbag (SCAB) assembly. However, embodiments are intended to include or otherwise cover any type of airbag assembly, including assemblies for front airbags such as steering wheel and dashboard airbags, knee airbags, and other types of side airbags such as torso airbags.

I. Vehicle and Airbag Lid Assembly

Figure 1:
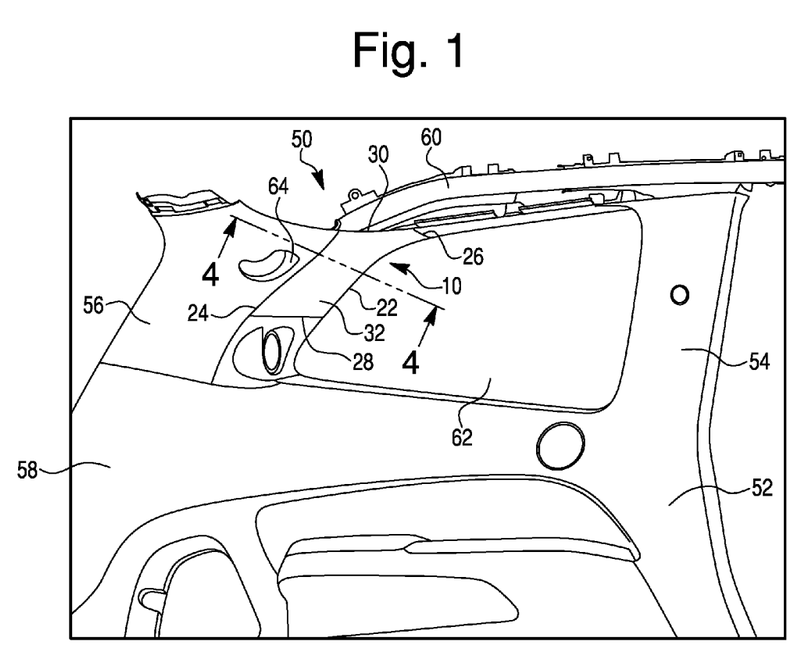
FIG. 1 is a partial perspective view of an exposed side of the airbag lid assembly within an exemplary vehicle in accordance with the disclosed subject matter.

FIG. 1 is a partial perspective view of a vehicle 50 showing an exposed side of the airbag lid assembly 10. The vehicle 50 shown in FIG. 1 is primarily for use on paved roadways, and can be referred to as a passenger vehicle. However, as indicated above, the disclosed airbag lid assembly 10 can be used with any vehicle that is configured to travel along any one or combination of improved, unimproved, and unmarked roadways and paths constituted by gravel, dirt, sand, etc. For example, embodiments are intended to include or otherwise cover any other type of automobile, including passenger car, truck, ATV, etc. In fact, embodiments are intended to include or otherwise cover configurations of the airbag lid assembly 10 for use in any other type of vehicle, such as an aircraft, boat, ship, train, spacecraft, etc. Some other embodiments can be used in non-vehicular carrier applications, such as for amusement park rides or any other situation where airbag deployment can enhance outcomes subsequent to transmission of a force.

The exemplary vehicle 50 can include a vehicle body 52 having a C-pillar 54 and a D-pillar 56 surrounding or otherwise being provided at opposite sides of a rear window 62 and joined together by a vehicle side panel 58 and a roof rail 60. The C-pillar 54 and D-pillar 56 extend upward from the vehicle side panel 58 toward the roof rail 60, and both the vehicle side panel 58 and roof rail 60 extend longitudinally along the length of the vehicle 50. In the embodiment shown in FIG. 1, the airbag lid assembly 10 is included in a portion of the D-pillar 56 adjacent the rear window 62.

However, the various embodiments are intended to include or otherwise cover any configuration or position of the airbag lid assembly 10, such as but not limited to the airbag lid assembly 10 being included in the C-pillar 54, a B-pillar (not shown), or an A-pillar (not shown) of the vehicle 10. The airbag lid assembly 10 may also be included in a steering wheel, a dashboard, a center console, a seat, or any other vehicle component capable of deploying an airbag. In other words, the airbag lid assembly 10 can be formed within any component of the vehicle 10 capable of deploying an airbag.

The exemplary airbag lid assembly 10 can be configured as a side curtain airbag lid assembly 10 intended to protect occupants from the side in the event of a vehicular collision. For example the side curtain airbag may be especially beneficial to protect occupants from contacting a side of the interior of the vehicle, such as in the event of a side of the vehicle colliding with an object (or in accordance with any other event that may create a force resulting in the occupant colliding with in interior side of the vehicle).

As discussed in more detail below, some embodiments are intended to include a lid hinge 12 and perforated seams that enable the airbag lid assembly 10 to tear at the seams and fold open via the lid hinge 12 to safely facilitate deployment of the airbag 42.

II. Airbag Lid Assembly Structure

Figure 2:
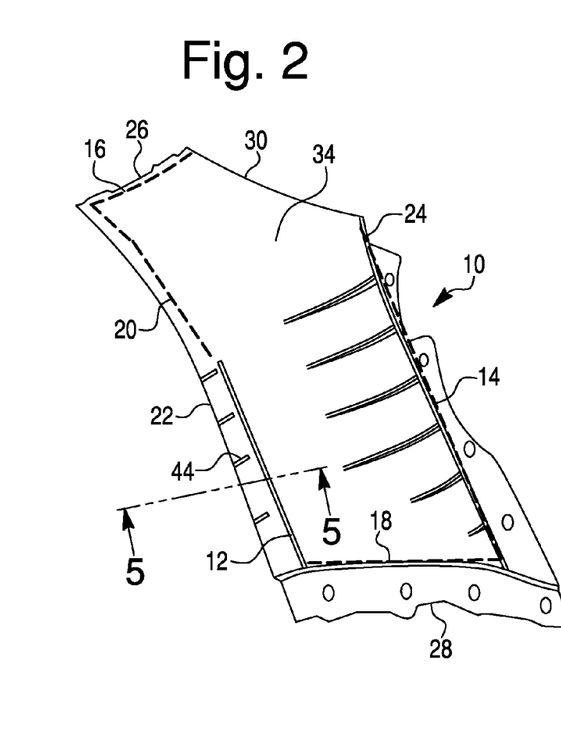
FIG. 2 is a perspective view of a concealed side of the airbag lid assembly of FIG. 1.

FIG. 2 is a perspective view of a concealed side of the airbag lid assembly 10. A concealed lid surface 34 of the airbag lid assembly 10 is defined by a bottom edge 28, a hinge side edge 22, a corner edge 26, a top edge 30, and a pillar side edge 24. In other words, these features define a perimeter of the airbag lid assembly 10. The airbag lid assembly 10 perimeter may be defined by a greater or fewer number of edges so as to be easily attachable to the D-pillar 56 of the vehicle 50, or another component proximate to side curtain airbag deployment, such as the C-pillar 54, a B-pillar (not shown), or an A-pillar (not shown).

Additionally, the concealed lid surface 34 is contoured to the D-pillar 56 and adjacent structures to which it is attached in the vehicle 50. As shown in more detail in FIG. 3, the airbag lid assembly 10 has a hinge brace 38 and a tear brace 40 at the hinge side edge 22 and the pillar side edge 24, respectively, which connect the airbag lid assembly 10 to the D-pillar 56 and adjacent structures. The braces 38 and 40 are reinforced support pieces formed to the airbag lid assembly 10 and can include bolts, screws, rivets, or any other suitable fixtures. The braces 38 and 40 can extend a length of the respective edges 22 and 24, or may extend a partial length of the respective edges 22 and 24. Furthermore, other braces may extend along other edges of the airbag lid assembly 10, such as the bottom edge 28.

Figure 3:
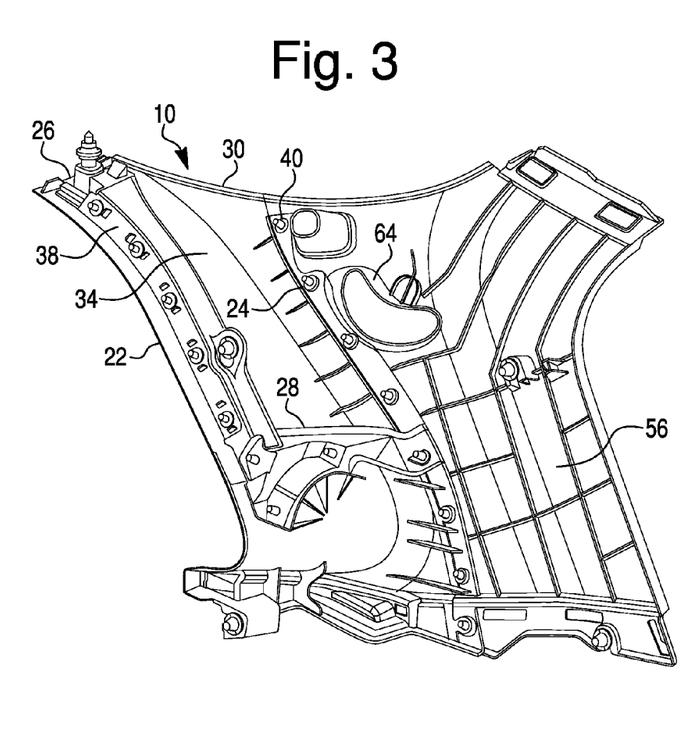
FIG. 3 is a perspective view of the concealed side of the airbag lid assembly connected to an exemplary D-pillar of the vehicle of FIG. 1.

The top edge 30 of the airbag lid assembly 10 forms a continuous edge with an upper edge of the D-pillar 56, and specifically, a cover of the D-pillar 56 which covers the D-pillar 56 and provides a seat belt outlet 64 through which a seat belt of a rear seat of the vehicle 50 is passed. The top edge 30 may be adjacent to the D-pillar 56 without being directly attached to the D-pillar 56, and instead can be held in place by the corner edge 26 and the pillar side edge 24, which contact either side of the top edge 30. Alternatively, the top edge 30 may be attached to the D-pillar 56 and surrounding structures by adhesive applied to a portion of the concealed lid surface 34 near the top edge 30.

III. Airbag Lid Assembly Hinge and Seams

The airbag lid assembly 10 includes a lid hinge 12 extending a partial length of the hinge side edge 22 of the airbag lid assembly. The lid hinge 12 can extend approximately halfway up along the hinge side edge 22, however the lid hinge 12 may alternatively extend less than or more than halfway up, such as approximately one quarter or three quarters of the way up the hinge side edge 22.

In the present embodiment, the lid hinge 12 is a living hinge formed as a thinned portion of material between the exposed lid surface 32 and the concealed lid surface 34. The thinned portion of material extends a length of the lid hinge 12 and results in increased flexibility compared to surrounding portions of material that are not thinned. As shown in more detail in FIG. 5, the lid hinge 12 of the concealed lid surface 34 can have a valley or depression that serves as the thinned portion of material, thereby biasing the airbag lid assembly 10 and allowing it to flex and bend at the lid hinge 12. Alternatively, the exposed lid surface 32 may be recessed at the lid hinge 12 to form a valley or depression around which the bag lid assembly 10 flexes and bends. Furthermore, other types of hinges may be used instead of a living hinge, such as a floating hinge, plain bearing, or other type of joint.

Figure 5:
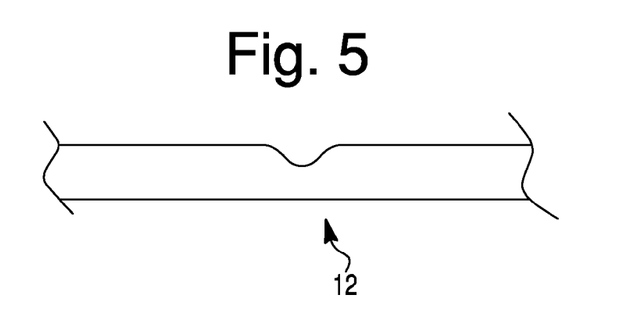
FIG. 5 is a cross-sectional view of a lid hinge of the airbag lid assembly taken along line 5-5 of FIG. 2.

The lid hinge 12 serves to provide a joint around which the airbag lid folds when the airbag and airbag lid assembly 10 deploy. As indicated above, other structures may be used to achieve a folding joint of the airbag lid assembly 10.

In the present embodiment, the lid hinge 12 is reinforced by hinge ribs 44 extending perpendicular to the lid hinge 12. The hinge ribs 44 are horizontal protrusions that strengthen the airbag lid assembly 10 and add rigidity to the area surrounding the lid hinge 12 so as to deter the lid hinge 12 from tearing or malfunctioning when the airbag and the airbag lid assembly 10 deploy and the seams 14, 16, 18, 20 tear. The lid hinge 12 may have any number of hinge ribs 44 including zero as the number of hinge ribs 44 is dependent upon desired strength of the lid hinge 12.

The airbag lid assembly 10 also includes a top seam 16, a pillar seam 14, a bottom seam 18 and a hinge seam 20 extending along a portion of the perimeter of the airbag lid assembly 10. Specifically, the top seam 16 extends along the corner edge 26, the pillar seam 14 extends along the pillar side edge 24, the bottom seam 18 extends along the bottom edge 28, and the hinge seam 20 extends along the hinge side edge 22. The seams 14, 16, 18, 20 are spaced inwardly from the respective edges 24, 26, 28, 22 so as to be separated from the edges 24, 26, 28, 22, forming an outer fringe. Separation of the outer fringe allows a portion of the airbag assembly lid 10 to remain attached to the D-pillar 56 and adjacent structures of the vehicle 50 upon deployment of the airbag 42 and the airbag lid assembly 10. As discussed below, when deployment of the airbag 42 and the airbag lid assembly 10 causes the airbag lid 36 to fold downward and towards the rear window 62 of the vehicle 50, the outer fringe of the airbag lid assembly 10 surrounding the airbag lid 36 (material separating the seams 14, 16, 18, 20 from the respective edges 24, 26, 28, 22) remains connected to the D-pillar 56 and adjacent structures of the vehicle 50 and do not fold downward and towards the rear window 62 of the vehicle 50. In other words, the airbag lid assembly 10 remains connected to the D-pillar 56 and adjacent structures after deployment of the airbag 42 and airbag lid assembly 10 via the outer fringe, and specifically the braces 38 and 40 at the respective edges 22 and 24 of the airbag lid assembly 10, and the airbag lid 36 remains connected to the airbag lid assembly 10 via the lid hinge 12.

In the present embodiment, the seams 14, 16, 18, 20 include intermittent gaps in material of the airbag lid assembly 10. The seams 14, 16, 18, 20 may have different configurations of material to gaps, as discussed below. Alternatively, the seams 14, 16, 18, 20 can all share a gap configuration from any of the configurations discussed.

A size of the intermittent gaps of the top seam 16 and the hinge seam 20 may be configured to be a 1:2 ratio with material of the airbag lid assembly 10 along the seams 16 and 20. For example, the top seam 16 and the hinge seam 20 can have a 5 mm gap for each 10 mm of material, alternating between gap and material by the 1:2 ratio for the length of the seams 16 and 20.

A size of the intermittent gaps of the pillar seam 14 and the bottom seam 18 may be configured to be alternating 27:5 and 27:2 ratios with material of the airbag lid assembly 10 along the seams 14 and 18. For example, the pillar seam 14 and the bottom seam 18 can have a 27 mm gap, followed by 2 mm of material, followed by another 27 mm gap, and then followed by 5 mm of material, such that each 27 mm gap is adjacent to a 5 mm of material side and a 2 mm of material other side. In this way, the size of the gaps remain constant at 27 mm while the size of material separating the gaps alternates between 5 mm and 2 mm for the length of the seams 14 and 18.

As mentioned above, the configuration of the gaps and material of the seams 14, 16, 18, 20 can include a variety of ratios and alternating patterns that are appropriate for the amount of force the airbag lid assembly 10 is meant to withstand before the seams 14, 16, 18, 20 tear.

Additionally, the pillar seam 14 and the bottom seam 18 form an acute angle where the seams 14 and 18 intersect. The angle of intersection may alternatively be a right angle, or even an obtuse angle dependent upon a shape and structure of the airbag lid assembly 10, and specifically a shape of the airbag lid 36.

Furthermore, the pillar seam 14 is curved so as to follow the contour of the pillar side edge 24. The curve of the pillar seam 14 may be concave or convex dependent upon a shape and structure of the airbag lid assembly 10, and specifically a shape of the airbag lid 36.

IV. Airbag Deployment

Figure 4:
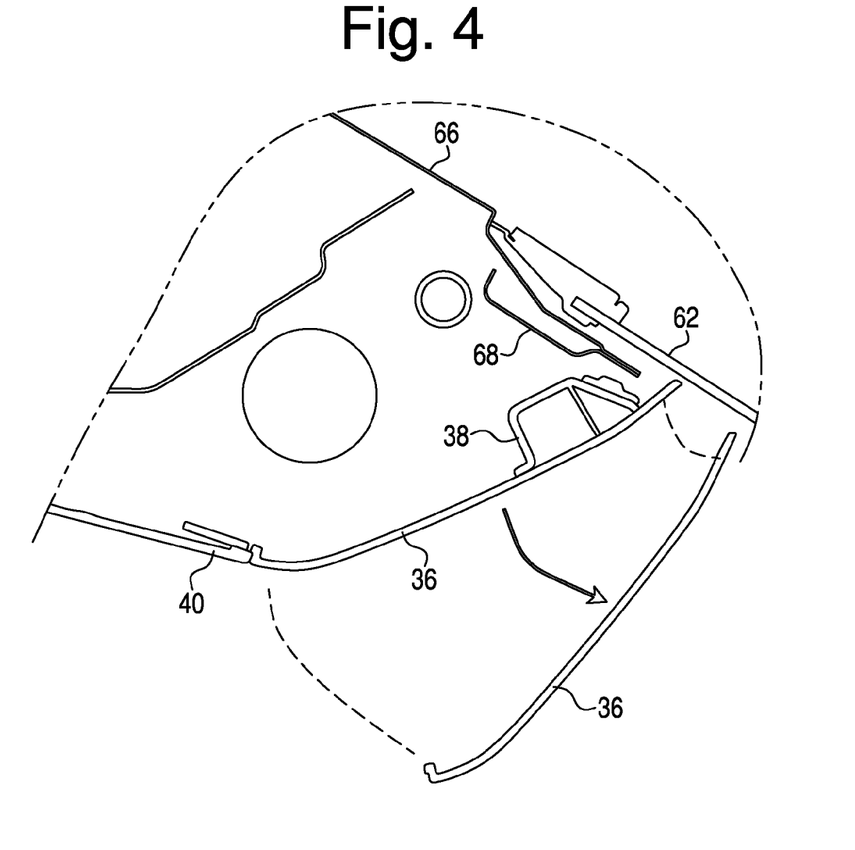
FIG. 4 is a cross-sectional view of the airbag lid assembly taken along line 4-4 of FIG. 1.

FIG. 4 shows exemplary approximate movement of the airbag lid 36 in relation to surrounding structures during deployment. As shown, the airbag lid 36 rotates about the lid hinge proximate to the rear window 62 of the vehicle. Deployment of the airbag 42 and the airbag lid assembly 10 moves the airbag lid 36 from the tear brace 40 towards the rear window 62, folding around the hinge brace 38.

FIGS. 6-11 illustrate various steps in successive points in time of deployment of the airbag 42 and airbag lid assembly 10 in accordance with some exemplary embodiments, with the airbag 42 omitted from FIGS. 7-10 for clarity. The deployment process displaces the airbag 42 from a pre-deployed configuration (not shown), in which the airbag 42 is located adjacent to the roof rail 60 and above the airbag lid assembly 10, to a fully deployed configuration in FIG. 11. Deployment manipulates the airbag 42 to unravel and inflate, thereby extending downward from the roof rail 60 and forming a barrier between occupants and an impacted side of the vehicle 50. Deployment of the airbag 42 also manipulates the airbag lid assembly 10 to tear and fold downward, facilitating inflation of the airbag 42 into a correct and safe position.

Figure 6:
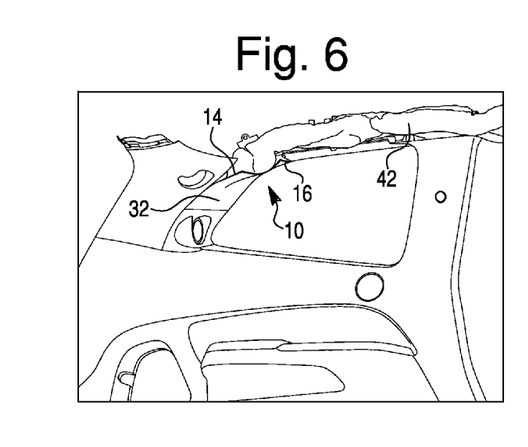
FIG. 6 is a perspective view of an exposed side of the airbag lid assembly during airbag deployment after a portion of an opposite seam and a top seam have torn at a first time t1.

FIG. 6 is a partial perspective view of an initial step of deployment of the airbag 42 and the airbag lid assembly 10 at a first time t1. At initial deployment, the airbag 42 begins to unravel and inflate, expanding and pressing on the concealed lid surface 34 of the airbag lid assembly 10. In the exemplary embodiment, pressing force of the airbag 42 on the concealed lid surface 34 causes the airbag lid 36 to begin to tear and fold downward and away from the D-pillar 56. As shown in FIG. 6, the top edge 30 of the airbag lid assembly 10 begins to separate away from the D-pillar 56 as the pillar seam 14 and the top seam 16 begin to tear, however other seams may also tear due to pressing force from inflation of the airbag 42. A top portion of the airbag lid simultaneously begins to fold downward as the pillar seam 14 and the top seam 16 begin to tear.

Figure 7:
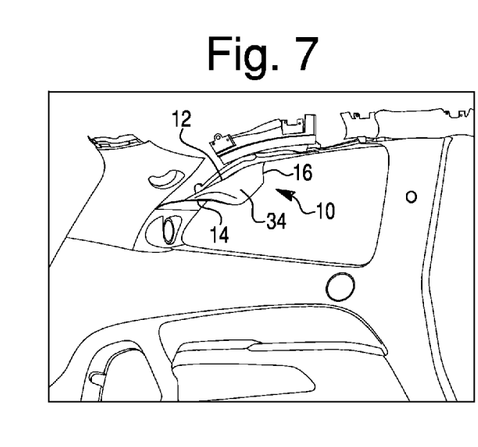
FIG. 7 is a perspective view of the exposed side of the airbag lid assembly during airbag deployment after the opposite seam and the top seam have torn at a second time t2.

FIG. 7 is a partial perspective view of another step of deployment of the airbag (not shown) and the airbag lid assembly 10 at a second time t2. At this step of deployment, pressing force from further inflation of the airbag (not shown) on the concealed lid surface 34 causes the top edge 30 to separate further away from the D-pillar 56, and the pillar seam 14 and the top seam 16 tear completely, resulting in the airbag lid folding further downward and towards the window of the vehicle, exposing the concealed lid surface 34 of the airbag lid assembly 10.

Figure 8:
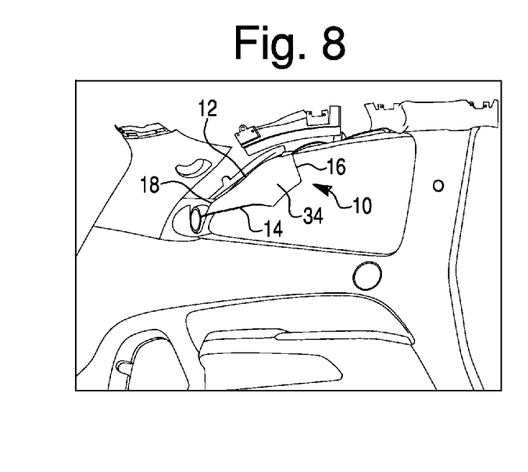
FIG. 8 is a perspective view of the exposed side of the airbag lid assembly during airbag deployment after the opposite seam, the top seam, and a portion of a bottom seam have torn at a third time t3.

FIG. 8 is a partial perspective view of another step of deployment of the airbag (not shown) and the airbag lid assembly 10 at a third time t3. At this step of deployment, pressing force from further inflation of the airbag (not shown) on the concealed lid surface 34 causes further separation of the top edge 30 from the D-pillar 56 while the bottom seam 18 begins to tear, starting at a corner between the pillar seam 14 and the bottom seam 18 and continuing in a direction towards the lid hinge 12. The airbag lid folds further downward and towards the window of the vehicle, further exposing the concealed lid surface 34 of the airbag lid assembly 10.

Figure 9:
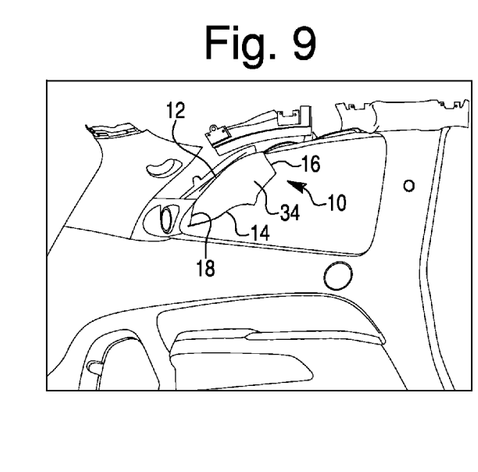
FIG. 9 is a perspective view of the exposed side of the airbag lid assembly during airbag deployment after the opposite seam, the top seam, and the bottom seam have torn at a fourth time t4.

FIG. 9 is a partial perspective view of another step of deployment of the airbag (not shown) and the airbag lid assembly 10 at a fourth time t4. At this step of deployment, pressing force from further inflation of the airbag (not shown) on the concealed lid surface 34 causes further separation of the top edge 30 of the D-pillar 56 while the bottom seam 18 tears completely, resulting in the airbag lid folding further downward and towards the window of the vehicle, further exposing the concealed lid surface 34 of the airbag lid assembly 10.

Figure 10:
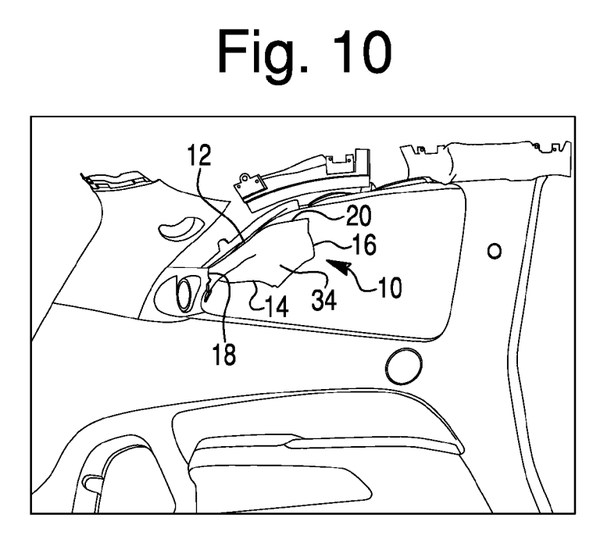
FIG. 10 is a perspective view of the exposed side of the airbag lid assembly during airbag deployment after the opposite seam, the top seam, the bottom seam, and an adjacent seam have torn at a fifth time t5.

FIG. 10 is a partial perspective view of another step of deployment of the airbag (not shown) and the airbag lid assembly 10 at a fifth time t5. At this step of deployment, pressing force from further inflation of the airbag (not shown) on the concealed lid surface 34 causes even further separation of the top edge 30 from the D-pillar 56 while the hinge seam 20 tears, resulting in the airbag lid folding further downward and towards the window of the vehicle, further exposing the concealed lid surface 34 of the airbag lid assembly 10. The lid hinge 12 remains untorn and serves as a pivot about which the airbag lid folds through deployment of the airbag (not shown) and the airbag lid assembly 10.

Figure 11:
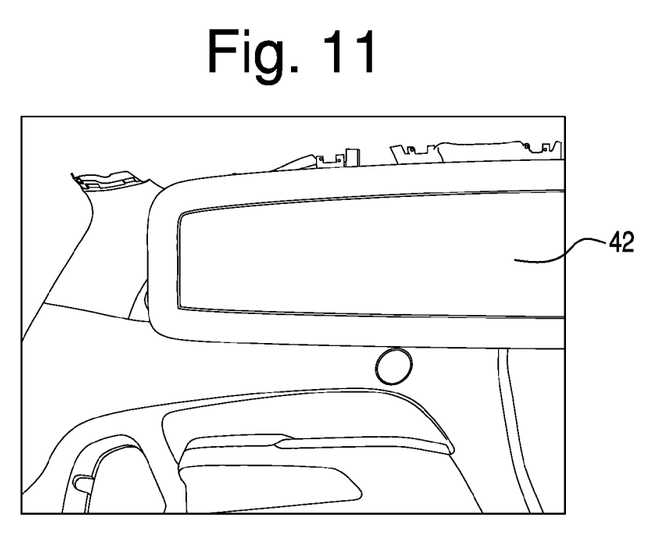
FIG. 11 is a perspective view of the exposed side of the airbag lid assembly after airbag deployment.

FIG. 11 is a partial perspective view of a final step of deployment of the airbag 42 and the airbag lid assembly (not shown). At this step of deployment, pressing force from full inflation of the airbag 42 on the concealed lid surface (not shown) has caused both the top edge 30 to be separated and spaced from the D-pillar 56, and the seams (not shown) to completely tear, resulting in the airbag lid having folded downward and towards the window of the vehicle. The airbag 42 has inflated to extend between occupants of the vehicle and the airbag lid (not shown), separating the occupants from the airbag lid while pressing the airbag lid towards the window of the vehicle.

In the present embodiment, deployment of the airbag 42 and the airbag lid assembly 10 occurs in accordance with the tearing and folding as discussed above. However, deployment can also result in alternate tearing and folding configurations, such as according to an alternative order of seam tearing and airbag lid folding, and/or an alternative degree of seam tearing and airbag lid folding. In other words, the seams and airbag lid may tear and fold in accordance with a variety of different orders and/or in accordance with a variety of different degrees.

V. Alternative Embodiments

In the disclosed embodiment, various structures are applied to a side curtain airbag (SCAB) of a vehicle. However, the disclosed structures may alternatively be applied to or modified to cover any type of airbag assembly, including assemblies for front airbags such as steering wheel and dashboard airbags, knee airbags, and other types of side airbags such as torso airbags.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

In the disclosed exemplary embodiments, the airbag lid assembly is attached to the D-pillar of the vehicle. However, the airbag lid assembly can be attached to any component of the vehicle capable of deploying an airbag, such as the C-pillar, B-pillar, A-pillar, etc.

Embodiments are also intended to include or otherwise cover methods of using and methods of manufacturing any or all of the elements disclosed above. The methods of manufacturing include or otherwise cover processors and computer programs implemented by processors used to design various elements of the vehicle door adjuster disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An airbag lid assembly for use with an airbag disposed for deployment within a vehicle interior of a vehicle, at least a portion of the airbag being disposed prior to deployment at a roof element adjacent a structural pillar that is proximate a window of the vehicle, the window being defined at least in part by a window frame at the structural pillar of the vehicle, the airbag lid assembly comprising:

an outer fringe that defines a portion of an outer periphery of the airbag lid assembly, the outer fringe including a hinge side portion defining a first section of a hinge side edge of the airbag lid assembly adjacent the window, and a pillar side portion defining a pillar side edge of the airbag lid assembly adjacent the structural pillar; and an airbag lid defining a surface that is configured to cover at least a portion of the airbag prior to deployment, the airbag lid being separated from the hinge side portion and the pillar side portion of the outer fringe by a seam that is configured to tear and thereby separate the airbag lid from the hinge side portion and the pillar side portion of the outer fringe upon airbag deployment, the airbag lid including a hinge portion disposed adjacent a second section of the hinge side edge of the airbag lid assembly, the hinge portion remaining attached to the window frame of the vehicle subsequent to airbag deployment, and including a hinge that is configured to enable the airbag lid to bend about the hinge such that a portion of the airbag lid at an interior side of the hinge is maneuvered away from the structural pillar upon airbag deployment.

2. The airbag lid assembly according to claim 1, wherein the pillar side portion of the outer fringe includes a bottom region that defines a bottom edge of the airbag lid assembly, and the hinge defines a first longitudinal end adjacent the bottom region of the pillar side portion of the outer fringe, the hinge also defining a second longitudinal end disposed at an approximately longitudinal midpoint of the airbag lid.

3. The airbag lid assembly according to claim 2, wherein an end of the seam that separates the hinge side portion of the outer fringe from the airbag lid is adjacent to the second longitudinal end of the hinge.

4. The airbag lid assembly according to claim 3, wherein the pillar side portion of the outer fringe includes a side region that extends longitudinally from the bottom region and at an acute angle, the side region also extending substantially parallel to the longitudinally extending hinge.

5. The airbag lid assembly according to claim 4, wherein the outer fringe includes a top portion that is separated from the airbag lid by a top seam that is contiguous with the seam separating the hinge side portion of the outer fringe from the airbag lid.

6. The airbag lid assembly according to claim 5, wherein the top portion is contiguous with the hinge side portion of the outer fringe.

7. The airbag lid assembly according to claim 6, wherein the top seam is defined by multiple gaps that are separated from each other by a substantially uniform first distance, and the seam separating the airbag lid from the pillar side portion is defined by multiple gaps that are separated from each other by at least two different second distances.

8. The airbag lid assembly according to claim 7, wherein each of the second distances is longer than the uniform first distance.

9. The airbag lid assembly according to claim 1, wherein the hinge is a living hinge.

10. The airbag lid assembly according to claim 1, wherein the hinge extends longitudinally, and the hinge portion of the airbag lid defines ribs that each extend generally perpendicular to the hinge.

11. An airbag assembly for use within a vehicle interior of a vehicle, the vehicle including a roof element adjacent a structural pillar that is proximate a window of the vehicle, the window being defined at least in part by a window frame at the structural pillar of the vehicle, the airbag assembly comprising:
    an airbag disposed for deployment within the vehicle interior, at least a portion of the airbag being disposed prior to deployment at the roof element of the vehicle; and
    an airbag lid assembly that includes:
        an outer fringe that defines a portion of an outer periphery of the airbag lid assembly, the outer fringe including a hinge side portion defining a first section of a hinge side edge of the airbag lid assembly adjacent the window, and a pillar side portion defining a pillar side edge of the airbag lid assembly adjacent the structural pillar; and
        an airbag lid defining a surface that is configured to cover at least a portion of the airbag prior to deployment, the airbag lid being separated from the hinge side portion and the pillar side portion of the outer fringe by a seam that is configured to tear and thereby separate the airbag lid from the hinge side portion and the pillar side portion of the outer fringe upon airbag deployment, the airbag lid including a hinge portion disposed adjacent a second section of the hinge side edge of the airbag lid assembly, the hinge portion remaining attached to the window frame of the vehicle subsequent to airbag deployment, and including a hinge that is configured to enable the airbag lid to bend about the hinge such that a portion of the airbag lid at an interior side of the hinge is maneuvered away from the structural pillar upon airbag deployment.

12. The airbag assembly according to claim 11, wherein the pillar side portion of the outer fringe includes a bottom region that defines a bottom edge of the airbag lid assembly, and the hinge defines a first longitudinal end adjacent the bottom region of the pillar side portion of the outer fringe, the hinge also defining a second longitudinal end disposed at an approximately longitudinal midpoint of the airbag lid.

13. The airbag assembly according to claim 12, wherein an end of the seam that separates the hinge side portion of the outer fringe from the airbag lid is adjacent to the second longitudinal end of the hinge.

14. The airbag assembly according to claim 13, wherein the pillar side portion of the outer fringe includes a side region that extends longitudinally from the bottom region and at an acute angle, the side region also extending substantially parallel to the longitudinally extending hinge.

15. The airbag assembly according to claim 14, wherein the outer fringe includes a top portion that is separated from the airbag lid by a top seam that is contiguous with the seam separating the hinge side portion of the outer fringe from the airbag lid.

16. The airbag assembly according to claim 15, wherein the top portion is contiguous with the hinge side portion of the outer fringe.

17. The airbag assembly according to claim 16, wherein the top seam is defined by multiple gaps that are separated from each other by a substantially uniform first distance, and the seam separating the airbag lid from the pillar side portion is defined by multiple gaps that are separated from each other by at least two different second distances, each of the second distances being longer than the uniform first distance.

18. The airbag assembly according to claim 11, wherein the hinge is a living hinge.

19. The airbag assembly according to claim 11, wherein the hinge extends longitudinally, and the hinge portion of the airbag lid defines ribs that each extend generally perpendicular to the hinge.

20. A method of manufacturing an airbag lid assembly for use with an airbag disposed for deployment within a vehicle interior of a vehicle, at least a portion of the airbag being disposed prior to deployment at a roof element adjacent a structural pillar that is proximate a window of the vehicle, the window being defined at least in part by a window frame at the structural pillar of the vehicle, the method comprising:
    forming an outer fringe so as to define a portion of an outer periphery of the airbag lid assembly;
    configuring the outer fringe to define a hinge side portion that forms a first section of a hinge side edge of the airbag lid assembly adjacent the window, and a pillar side portion that forms a pillar side edge of the airbag lid assembly adjacent the structural pillar;
    forming an airbag lid so as to define a surface that is configured to cover at least a portion of the airbag prior to deployment;
    separating the airbag lid from the hinge side portion and the pillar side portion of the outer fringe by a seam that is configured to tear and thereby separate the airbag lid from the hinge side portion and the pillar side portion of the outer fringe upon airbag deployment;
    configuring the airbag lid to include a hinge portion disposed adjacent a second section of the hinge side edge of the airbag lid assembly, the hinge portion being configured to remain attached to the window frame of the vehicle subsequent to airbag deployment; and
    forming a hinge that is configured to enable the airbag lid to bend about the hinge such that a portion of the airbag lid at an interior side of the hinge is maneuvered away from the structural pillar upon airbag deployment.

* * * * *